US011432122B2

(12) United States Patent
Moner Poy et al.

(10) Patent No.: US 11,432,122 B2
(45) Date of Patent: Aug. 30, 2022

(54) METHOD OF PROVISIONING HEADLESS DEVICES OF A WIRELESS COMMUNICATION SYSTEM

(71) Applicant: Carrier Corporation, Palm Beach Gardens, FL (US)

(72) Inventors: Hector Moner Poy, Cork (IE); Ankit Tiwari, East Hartford, CT (US); Pedro Fernandez Orellana, Cork (IE); Daniele Campana, Cork (IE); Michael Ramoutar, Westford, MA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 244 days.

(21) Appl. No.: 16/493,623

(22) PCT Filed: Mar. 20, 2018

(86) PCT No.: PCT/US2018/023294
§ 371 (c)(1),
(2) Date: Sep. 12, 2019

(87) PCT Pub. No.: WO2018/175395
PCT Pub. Date: Sep. 27, 2018

(65) Prior Publication Data
US 2020/0015050 A1 Jan. 9, 2020

Related U.S. Application Data

(60) Provisional application No. 62/473,538, filed on Mar. 20, 2017.

(51) Int. Cl.
*H04W 4/50* (2018.01)
*G06K 7/10* (2006.01)
(Continued)

(52) U.S. Cl.
CPC .......... *H04W 4/50* (2018.02); *G06K 7/10722* (2013.01); *G06K 7/1413* (2013.01);
(Continued)

(58) Field of Classification Search
CPC .. H04W 4/50; H04W 12/77; G06K 19/06028; G06K 2209/01
(Continued)

(56) References Cited

U.S. PATENT DOCUMENTS 8,014,722 B2  9/2011  Abel et al.
8,862,096 B1  10/2014  Viswanathan et al.
(Continued)

FOREIGN PATENT DOCUMENTS

CN  105682253 A  6/2016
EP  2549786 A1  1/2013
(Continued)

OTHER PUBLICATIONS

ISRP for Application No. PCT/US2018/023294 dated Jun. 21, 2018; 6 pages.
(Continued)

*Primary Examiner* — Paultep Savusdiphol
(74) *Attorney, Agent, or Firm* — Cantor Colburn LLP

(57) ABSTRACT

A method of provisioning a headless device includes the steps of acquiring credentials for a user application, then placing the headless device in a provisioning mode. Once in the provisioning mode, characters associated with the credentials are displayed by the user application, then the characters are read by an optical character reader (OCR) of the headless device, thereby allowing the headless device to join a network associated with the credentials.

13 Claims, 2 Drawing Sheets

(51) Int. Cl.
  *G06K 7/14* (2006.01)
  *G06K 19/06* (2006.01)
  *H04M 1/02* (2006.01)
  *H04W 12/06* (2021.01)
  *H04W 12/30* (2021.01)
  *H04W 12/77* (2021.01)
  *G06V 10/40* (2022.01)
  *H04W 84/12* (2009.01)
  *G06V 30/10* (2022.01)

(52) U.S. Cl.
  CPC ....... *G06K 19/06028* (2013.01); *G06V 10/40* (2022.01); *H04M 1/0202* (2013.01); *H04W 12/06* (2013.01); *H04W 12/35* (2021.01); *H04W 12/77* (2021.01); *G06V 30/10* (2022.01); *H04M 2250/52* (2013.01); *H04W 84/12* (2013.01)

(58) Field of Classification Search
  USPC ............................. 235/454, 462.13, 472.02
  See application file for complete search history.

(56) References Cited

U.S. PATENT DOCUMENTS

| | | | |
|---|---|---|---|
| 10,631,040 B2 * | 4/2020 | Britt | ................. H04L 67/12 |
| 10,638,417 B1 * | 4/2020 | Baki | ................... H04W 24/02 |
| 2013/0103847 A1 | 4/2013 | Brown et al. | |
| 2013/0200142 A1 | 8/2013 | Larson et al. | |
| 2013/0272223 A1 | 10/2013 | Mathews et al. | |
| 2014/0181521 A1 | 6/2014 | Hemphill et al. | |
| 2014/0247360 A1 * | 9/2014 | Trundle | ........... G08B 13/19639 |
| | | | 348/152 |
| 2015/0373538 A1 * | 12/2015 | Huang | .................. H04N 7/181 |
| | | | 726/5 |
| 2016/0227388 A1 * | 8/2016 | Goto | ..................... H04W 12/04 |
| 2017/0164412 A1 * | 6/2017 | Yu | ......................... H04W 12/06 |
| 2017/0257819 A1 * | 9/2017 | McCann | ............... H04W 12/35 |

FOREIGN PATENT DOCUMENTS

| | | |
|---|---|---|
| EP | 2741564 A1 | 6/2014 |
| EP | 2747339 A1 | 6/2014 |

OTHER PUBLICATIONS

Written Opinion for Application No. PCT/US2018/023294 dated Jun. 21, 2018; 10 pages.

* cited by examiner

METHOD OF PROVISIONING HEADLESS DEVICES OF A WIRELESS COMMUNICATION SYSTEM

CROSS-REFERENCE TO RELATED APPLICATIONS

This is a National Stage Application of PCT/US2018/023294 filed Mar. 20, 2018 which claims priority to U.S. Provisional Application No. 62/473,538 filed Mar. 20, 2017, both of which are incorporated herein by reference in their entirety.

BACKGROUND

The present disclosure relates to a wireless communication system and, more particularly, to a method of provisioning headless devices of the wireless communication system.

Provisioning is a process of connecting newly introduced wireless devices into a wireless communication system or network. This may be accomplished by providing a network name (i.e., SSID) and a security credential (e.g., a predefined password). The Internet of Things development has proliferated the appearance of headless Wi-Fi embedded devices. Provisioning of headless devices remains challenging because they lack a physical input and display.

SUMMARY

A method of provisioning a headless device according to one, non-limiting, embodiment of the present disclosure includes acquiring credentials for a user application; placing the headless device in a provisioning mode; displaying characters associated with the credentials by the user application; obtaining the characters by optical sensor of the headless device; and joining a network associated with the credentials.

Additionally to the foregoing embodiment, the headless device includes a user interface for placing the headless device in the provisioning mode.

In the alternative or additionally thereto, in the foregoing embodiment, the user interface is a switch constructed and arranged to be manually actuated for enabling the provisioning mode of the headless device.

In the alternative or additionally thereto, in the foregoing embodiment, the method includes extracting the credentials from the characters by the headless device before joining the network.

In the alternative or additionally thereto, in the foregoing embodiment, the user application is a smartphone including a screen for visually outputting the characters.

In the alternative or additionally thereto, in the foregoing embodiment, the optical sensor is a camera.

In the alternative or additionally thereto, in the foregoing embodiment, the characters are plain text.

In the alternative or additionally thereto, in the foregoing embodiment, the characters are encoded in a barcode.

In the alternative or additionally thereto, in the foregoing embodiment, the barcode is a matrix barcode.

In the alternative or additionally thereto, in the foregoing embodiment, the optical sensor is a phototransistor.

In the alternative or additionally thereto, in the foregoing embodiment, the characters are light flashes.

In the alternative or additionally thereto, in the foregoing embodiment, the user application is a smartphone including a screen, and the smartphone is configured to emit the light flashes from the screen.

In the alternative or additionally thereto, in the foregoing embodiment, the method includes generating the characters by the user application associated with the credentials.

In the alternative or additionally thereto, in the foregoing embodiment, the method includes sending a provisioning success signal by the headless device and to the use application for notifying the user of the provisioning success.

In the alternative or additionally thereto, in the foregoing embodiment, the headless device is wireless, and the provisioning success signal is sent through an Access Point (AP) device.

A method of provisioning a headless Wi-Fi device according to another, non-limiting, embodiment includes placing a user application configured to optically transmit characters physically in from of the headless Wi-Fi device; obtaining the characters by an optical sensor of the headless Wi-Fi device; and associating the characters to a network credential by the headless Wi-Fi device.

Additionally to the foregoing embodiment, the optical sensor is a phototransistor.

In the alternative or additionally thereto, in the foregoing embodiment, the optical sensor is an imaging sensor.

In the alternative or additionally thereto, in the foregoing embodiment, the method includes recognizing the characters by Optical Character Reader (OCR) functionality embedded in the headless Wi-Fi device.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
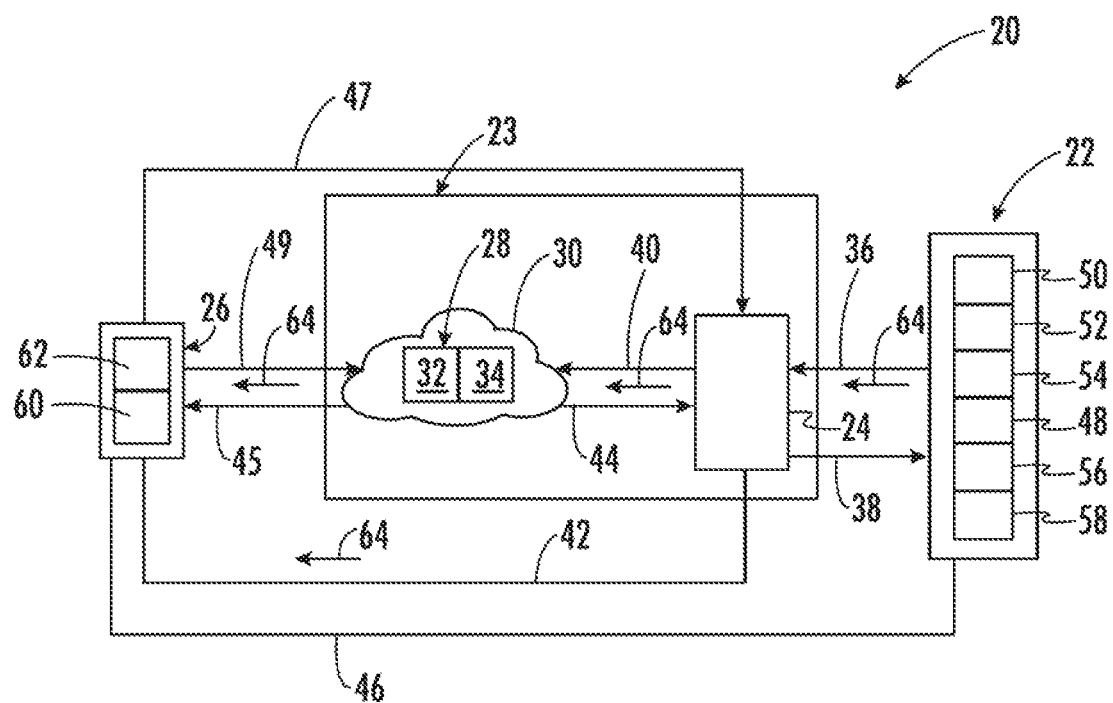
FIG. 1 is a schematic of a wireless communication system as one, non-limiting, exemplary embodiment of the present disclosure.

Referring to FIG. 1, an exemplary embodiment of a wireless communication system 20 is illustrated. The wireless communication system 20 may be a Wi-Fi network, and may include a wireless device 22, a control assembly 23, and a user application 26 that may be a mobile application. The control assembly 23 may include a gateway 24 (e.g., an Access Point (AP) device) and a controller 28. The controller 28 may be a server, and may be, or is part of, a cloud 30. The controller 28 may include a computing processor 32 and a storage medium 34. The wireless device 22 may be configured to communicate with the AP device 24 over a wireless pathway (see arrow 36). The AP device 24 may be configured to communicate with the wireless device 22, the controller 28, and/or the application 26 over respective pathways (see arrows 38, 40, 42) that may be wireless pathways. The cloud 30, and/or controller 28, may be configured to communicate with the AP device 24 over a pathway (see arrow 44) that may be wireless, and the application 26 over a pathway (see arrow 45) that may be wireless. The application 26 may be configured to communicate with the wireless device 22 over a pathway 46 that may be wireless, communicate with the AP device 24 over a wireless pathway (see arrow 47), and/or communicate with the controller 28 over a pathway (see arrow 49) that may be wireless. In one example, the mobile application 26 may directly connect to the cloud 30 via a third generation of mobile telecommunications technology (i.e., 3G), or indirectly through the AP device 24 (i.e., Home Wi-Fi). It is understood that the term "gateway" is treated broadly and is indicative of more than just Wi-Fi communications. For example, the gateway may support ZWave.

The gateway or AP device 24 may be a router having firmware that supports Wi-Fi Power Save Mode (PSM). The user application 26 may include a user interface 60 and a screen 62 that may be interactive. The user application 26 may be a smart phone, a digital media player, a tablet computer, and other applications. Examples of a wireless device 22 may include smart home sensors or intrusion sensors of a security system configured to detect the opening of windows or doors, Passive Infrared (PIR) sensors, image sensors, thermal sensors of a heating system configured to measure the temperature of ambient air, gas sensors configured detect the presence of gases, smoke detectors as part of a safety system, and many other types of devices that may utilize batteries and may communicate wirelessly.

The wireless device 22 may further be a smart device, an Internet of Things (IoT) device, and/or a Wi-Fi PSM device configured to communicate with the cloud 30 through the AP device 24. The wireless device 22 may include a power management module 48 (i.e., battery and a means of managing battery power), a sensor and/or actuator 50, a computing processor 52 (e.g., microcontroller), a wireless transceiver 54, an optical sensor 56, and a user interface 58 for placing the wireless device 22 in a provisioning mode. As a PSM device, the wireless device 22 is configured to enter into sleep and awake states at a pre-determined frequency and duration of time. In one embodiment, the sensor 50 may serve a dual function as the optical sensor 56.

The optical sensor 56 may be an electronic sensor that converts light, or a change in light, into an electronic signal. That is, the optical sensor 56 may be a phototransistor that measures the physical quantity of light and may then translate the light into a form that is readable by an instrument. Alternatively, the optical sensor may be an imaging sensor and/or a camera.

Figure 2:
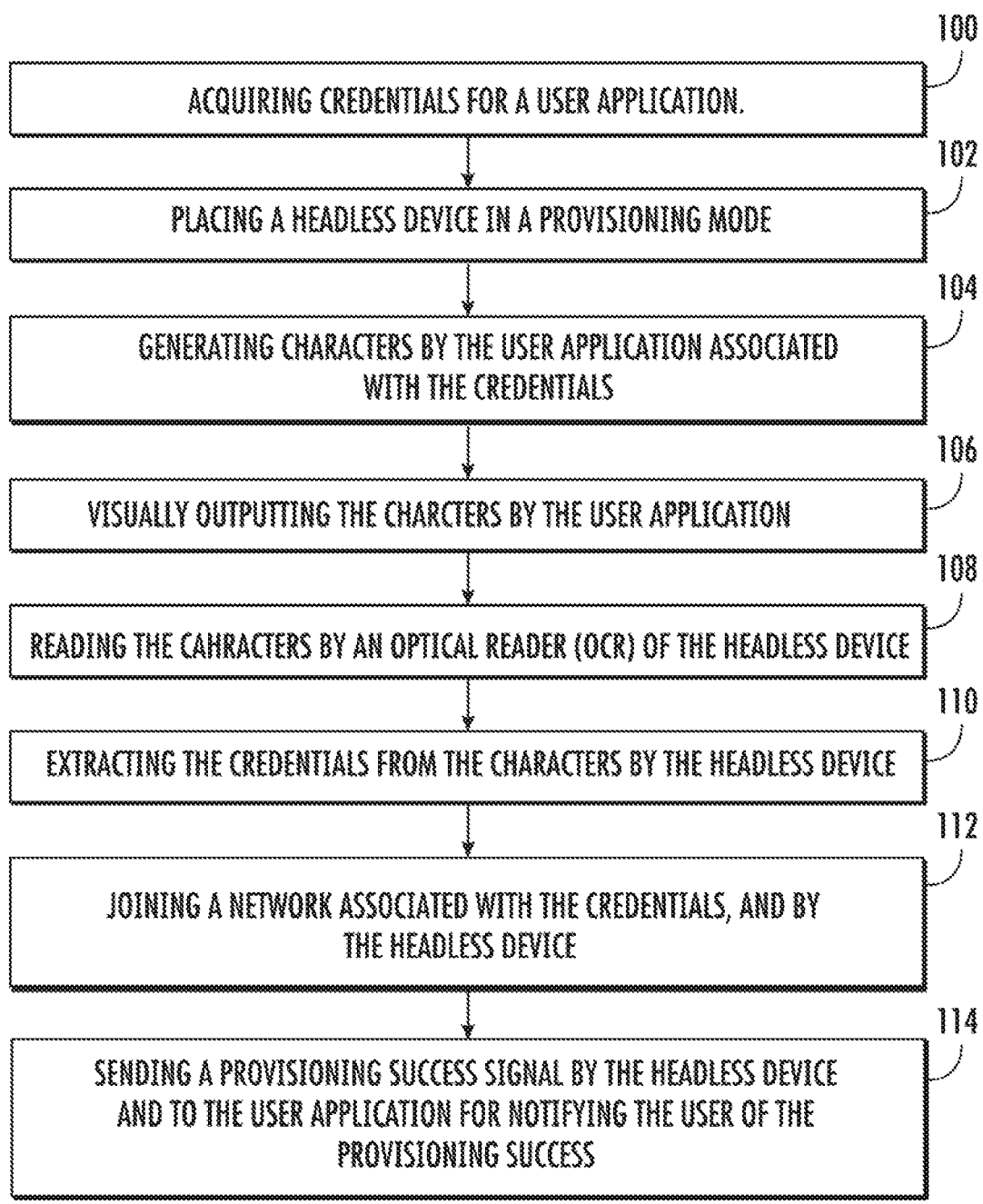
FIG. 2 is a flow chart of a method of provisioning a headless device of the wireless communication system.

Referring to FIG. 2, a method of provisioning the headless device 22 is illustrated. At block 100, the user application 26 may acquire credentials (e.g., network and/or Wi-Fi credentials) through user input via the user interface 60 of the user application, or by using existing network credentials pre-programmed into the user application. The network credentials may be, or may include other data such as, but not limited to, cloud server 28 data or a Uniform Resource Locator (URL).

At block 102, a user may manually place the headless device 22 in a provisioning mode by actuating the user interface 58 of the headless device 22. In one embodiment, the user interface 58 may be a switch that when actuated (e.g., manually actuated), will place the headless device 22 in the provisioning mode for a prescribed period of time. Non-limiting examples of a switch may include a toggle switch, a button, and others. At block 104, the user application 26 may generate characters that are directly associated with the credentials and generally transmitted visually or optically. In one embodiment, the characters may be a code that may not be immediately recognizable by the naked eye. In addition, the characters may be a bar code that may be a matrix bar code (i.e., QR code). In another embodiment, the characters may be a sequence of flashes, or another sequence or pattern of lighting that may, for example, change in color. Altering the credentials to coded characters may safeguard against an unwanted user that may otherwise maliciously capture the credentials.

In applications where malicious captures are not of concern, the user application 26 may simply be any passive object (e.g., paper), and the characters may be plain text written or printed upon the user application 26. Alternatively, in the example of light flashes as the characters, the user application 26 may simply be a flash light.

At block 106, the characters may be visually outputted by the user application 26. More specifically, if the optical sensor 56 of the headless device 22 is a camera, the user application 26 may be physically placed in front of the optical sensor 56 for imaging of the characters displayed, for example, on the screen 62 of the user application 26. The characters displayed may then be recognized by an OCR functionality embedded in the headless device 22. In another embodiment, if the optical sensor 56 is a phototransister, the characters may be flashes of light in a prescribed pattern that are emitted by the screen 62 and detected/received by the optical sensor 56 (i.e., phototransistor).

At block 108, the characters are received and/or read by the optical sensor 56 of the headless device 22. At block 110, the credentials are extracted from the characters by, for example, the computing processor 52 of the headless device 22. The credential may be determined using QR decoder, or any text recognition technique such as Optical Character Reader (OCR) functionality. At block 112, the headless device 22 may be configured to join the network 22, once the credentials are read/accepted via the characters. At block 114, the headless device 22 may be configured to send a provisioning success signal (see arrow 64 in FIG. 1) to the user application 26. In one example, the signal 26 may be sent along wireless pathway 36, through the AP device 24 and to the server 28 via wireless pathway 40. The server 28 may then send the signal 64 to the user application 26 via the pathway 45 (see FIG. 1). In an alternative embodiment, the headless device 22 may be configured to send the success signal 64 through the AP device 24, and directly to the user application 26 over wireless pathway 42.

Advantages and benefits of the present disclosure include an inexpensive provisioning method for Wi-Fi, headless, devices that include an optical sensor. Other advantages include the omission of any need to integrate the AP device 24 or server 28 functionalities into the headless device 22, and/or attach unique identifiers to devices of the network. Yet further, a secure method to provision the device is provided since only the intended user physically in front of the device 22 may provision it. Other advantages may include a reduction in memory and processing requirements of the headless device when compared to more traditional embedded AP approaches, a reduction in cost of the headless device particularly where phototransistors are applied as part of the optical sensor, and low energy consumption.

The various functions described above may be implemented or supported by a computer program that is formed from computer readable program codes and that is embodied in a computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other forms.

Terms used herein such as component, module, system, and the like are intended to refer to a computer-related entity, either hardware, a combination of hardware and software, or software execution. By way of example, a component may be, but is not limited to, a process running on a processor, a processor, an object, an executable, a thread of execution, a program, and/or a computer. It is understood that an application running on a server and the server may be a component. One or more components may reside within a process and/or thread of execution and a component may be localized on one computer and/or distributed between two or more computers.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A method of provisioning a headless device comprising:
    acquiring credentials for a user application;
    placing the headless device in a provisioning mode;
    displaying characters associated with the credentials by the user application;
    obtaining the characters by optical sensor of the headless device; and
    joining a network associated with the credentials, wherein the headless device includes a user interface for placing the headless device in the provisioning mode, and wherein the user interface is a switch constructed and arranged to be manually actuated for enabling the provisioning mode of the headless device.

2. The method set forth in claim 1, further comprising:
    extracting the credentials from the characters by the headless device before joining the network.

3. The method set forth in claim 1, wherein the user application is a smartphone including a screen for visually outputting the characters.

4. The method set forth in claim 1, wherein the optical sensor is a camera.

5. The method set forth in claim 4, wherein the characters are plain text.

6. The method set forth in claim 4, wherein the characters are encoded in a barcode.

7. The method set forth in claim 6, wherein the barcode is a matrix barcode.

8. The method set forth in claim 1, wherein the optical sensor is a phototransistor.

9. The method set forth in claim 8, wherein the characters are light flashes.

10. The method set forth in claim 9, wherein the user application is a smartphone including a screen, and the smartphone is configured to emit the light flashes from the screen.

11. The method set forth in claim 8, wherein the headless device is wireless, and the provisioning success signal is sent through an Access Point (AP) device.

12. The method set forth in claim 1, further comprising:
    generating the characters by the user application associated with the credentials.

13. The method set forth in claim 1, further comprising:
    sending a provisioning success signal by the headless device and to the user application for notifying the user of the provisioning success.

* * * * *